United States Patent [19]

Lynes

[11] 3,715,732

[45] Feb. 6, 1973

[54] TWO-TERMINAL NPN-PNP TRANSISTOR MEMORY CELL

[75] Inventor: Dennis Joseph Lynes, Madison, N.J.

[73] Assignee: Bell Telephone Laboratories, Incorporated, Murray Hill, Berkeley Heights, N.J.

[22] Filed: Dec. 9, 1971

[21] Appl. No.: 206,272

[52] U.S. Cl. ................340/173 R, 307/238, 307/288, 340/166 R, 340/173 CA, 340/173 NR, 340/173 FF

[51] Int. Cl. ..........................G11c 11/40, G11c 11/24

[58] Field of Search ...340/173 CA, 173 FF, 173 NR, 340/166 R, 173 R; 307/238, 288

[56] References Cited

UNITED STATES PATENTS

| | | | |
|---|---|---|---|
| 3,375,502 | 3/1968 | Shively | 340/173 R |
| 3,231,758 | 1/1966 | Diamant | 307/288 X |
| 3,469,110 | 9/1969 | Sherman | 307/288 X |
| 3,491,342 | 1/1970 | Lee | 307/238 X |

*Primary Examiner*—Bernard Konick
*Assistant Examiner*—Stuart Hecker
*Attorney*—R. J. Guenther et al.

[57] ABSTRACT

A semiconductor memory array contains memory cells each of which contains an NPN transistor and a PNP transistor. The collector and base of the NPN transistor are respectively coupled to the base and collector of the PNP transistor. Bit information is written into the cell by causing or inhibiting conduction in the PNP transistor in order to set the potential of the base of the NPN transistor to one of two values which represent, respectively, a "1" and a "0." A positive polarity voltage pulse applied to the collector of the NPN transistor causes information previously stored in the cell to be read out.

5 Claims, 6 Drawing Figures

TWO-TERMINAL NPN-PNP TRANSISTOR MEMORY CELL

BACKGROUND OF THE INVENTION

This invention relates to semiconductor memory apparatus utilizing memory cells of relatively simple structure which require little semiconductor area for implementation.

In many computer and other systems there exists the need for large information capacity semiconductor memories in which digital information can be temporarily stored and then retrieved within a useful period of time. In furtherance of this need, it is desirable that each individual memory cell of the array require as little semiconductor area for its implementation as possible and contain as few terminals as possible.

In the publication Electronics of Mar. 1, 1971, an article entitled "Bipolar Memory Cells Strike Back in War with MOS" on page 19 and the copending U.S. application, Ser. No. 103,169, filed Dec. 31, 1970 by D. J. Lynes and J. Mar, a two-terminal memory cell comprising a single junction transistor is described. This structure requires an extremely small semiconductor area for its implementation and contains only two terminals, but requires avalanche breakdown of one of the junctions of the transistor. While this device has many desirable electrical and physical features, it is recognized that repeated avalanche breakdown tends to degrade semiconductor device performance.

The copending U.S. application, Ser. No. 156,339 filed June 24, 1971 by J. D. Heightley and S. G. Waaben describes a two-terminal memory array comprising a plurality of interconnected two-terminal memory cells each of which comprises two serially connected PNP transistors. This memory cell has many desirable electrical characteristics and does not utilize avalanche breakdown. However, its physical size is still approximately five times that of the single transistor cell previously discussed.

A memory cell which does not utilize avalanche breakdown and is more comparable in size to a single transistor memory cell would be very desirable for use in large information capacity semiconductor memories.

OBJECTS OF THE INVENTION

Accordingly, it is a primary object of this invention to provide a semiconductor memory cell which has a relatively simple structure, requires relatively little semiconductor area for its implementation, and does not require avalanche breakdown operation.

It is a further object of this invention to provide a relatively large capacity semiconductor memory using an array of memory cells, each of which meets the above-mentioned objective.

SUMMARY OF THE INVENTION

These and other objects of the invention are attained in an illustrative embodiment thereof comprising a semiconductor memory array having a plurality of interconnected memory cells, each of which contains an NPN and a PNP transistor that stores digital information. In each of the memory cells the collector of the NPN transistor is coupled to the base of the PNP transistor and the base of the NPN transistor is coupled to the collector of the PNP transistor.

In the preferred embodiment of the memory cell the emitters of both transistors are coupled and first and second terminals are connected to the collector of the NPN transistor and the emitter of the PNP transistor, respectively.

A "1" is written into a selected cell of the array by forward-biasing the emitter-base junction of the PNP transistor of the cell in order to allow transient conduction through the PNP transistor. This conduction causes the potential of the base of the NPN transistor to be increased to one of two levels, which is defined as the "1" level. To read out information previously stored within the cell and to write a "0" into the cell, a positive polarity voltage pulse is applied to the collector of the NPN transistor. If the cell contains a stored "1,"the potential of the base of the NPN transistor will be raised sufficiently to cause conduction in the NPN transistor. This conduction, which is detected by a conduction detector test is coupled to the digit line connected to the selected cell and is indicative of a stored "1" in the cell. If a "0" is stored in the cell, the positive voltage pulse applied to the collector of the NPN transistor will not be of sufficient amplitude to cause conduction in the NPN transistor. This is indicative of a stored "0" in the cell. During the read operation the PNP transistor is biased so as to inhibit conduction within it. As will be made clear in the detailed description to follow, the read voltage pulse applied to the collector of the NPN transistor is coupled to its base through parasitic capacitances associated with the NPN transistor and the PNP transistor.

These and other objects, features, and embodiments will be better understood from a consideration of the following detailed description, taken in conjunction with the accompanying drawing.

DETAILED DESCRIPTION

Figure 1:
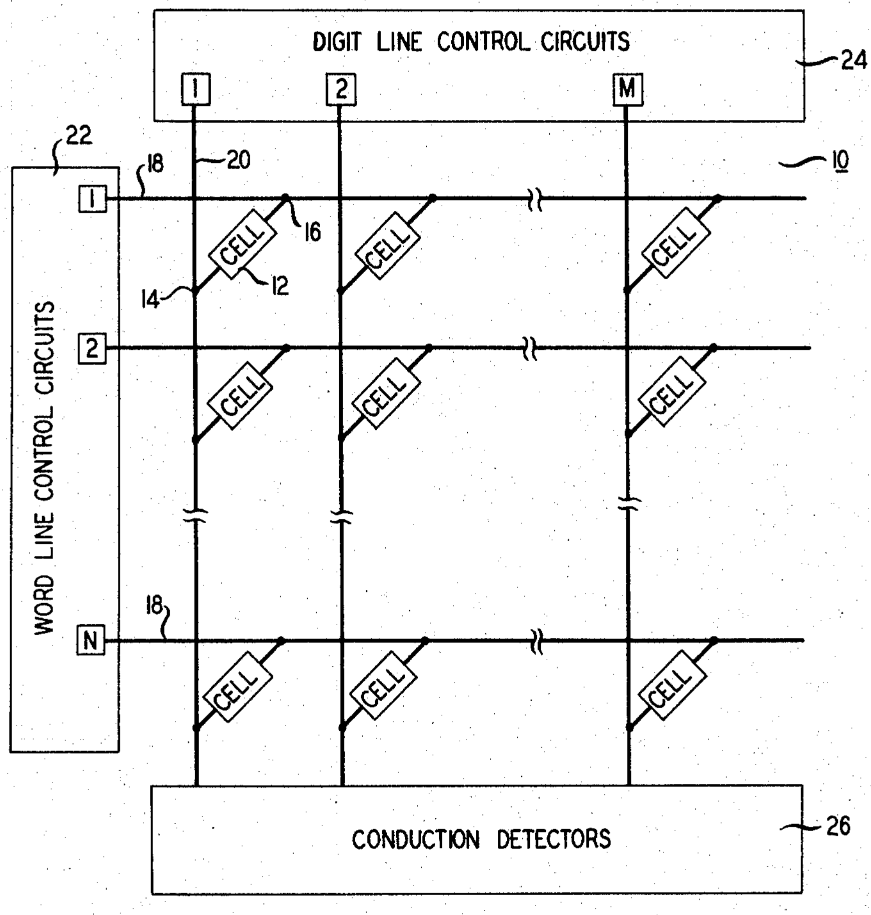
FIG. 1 illustrates a block circuit for a memory system in accordance with this invention.

Referring now to FIG. 1, there is shown the basic elements of a word-organized memory system 10 in accordance with this invention. A plurality of individual memory cells 12 are arranged in a two-dimensional array of M rows and N columns to form a memory having MXN memory cells. Each of the memory cells 12, having two terminals, 14 and 16, as illustrated, is capable of storing bit information for a useful period of time. One of the two terminals 16 is connected to a word line 18 and the other terminal 14 is connected to a digit line 20. All of the word lines 18 are connected to word line voltage control circuits 22 and all of the digit lines 20 are connected to digit line voltage control circuits 24 and conduction detectors 26.

Figure 2:
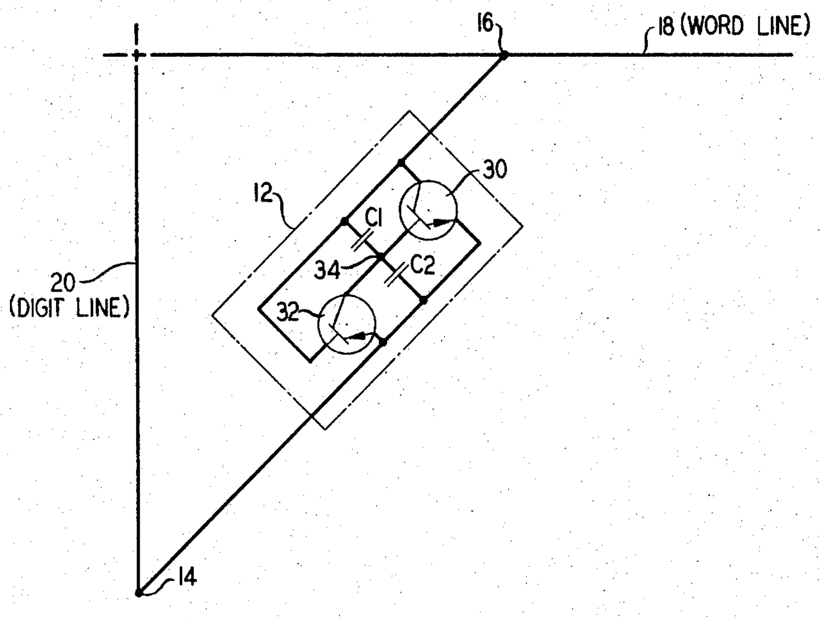
FIG. 2 illustrates a schematic circuit of one memory cell suitable for use in the memory system of FIG. 1.

Referring now to FIG. 2, there is illustrated a circuit schematic of a preferred memory cell suitable for use as the memory cell 12 illustrated in FIG. 1. More specifically, the cell shown inside the broken line rectangle 12 comprises a preferred embodiment of the inner structure of cell 12 of FIG. 1. As illustrated, the cell comprises an NPN junction transistor 30 and a PNP junction transistor 32. The base of the NPN transistor is common with the collector of the PNP transistor; the common node is denoted as 34. The emitters of both devices are coupled together and constitute terminal 14 of the memory cell. The collector of transistor 30 and the base of transistor 32 are coupled and constitute terminal 16 of the memory cell. Capacitance $C_1$ represents the equivalent parasitic capacitance associated with the collector-base junctions of both transistors. Capacitance $C_2$ represents the equivalent parasitic capacitance associated with the emitter-base junction of transistor 30 and the emitter collector of transistor 32.

Figure 3:
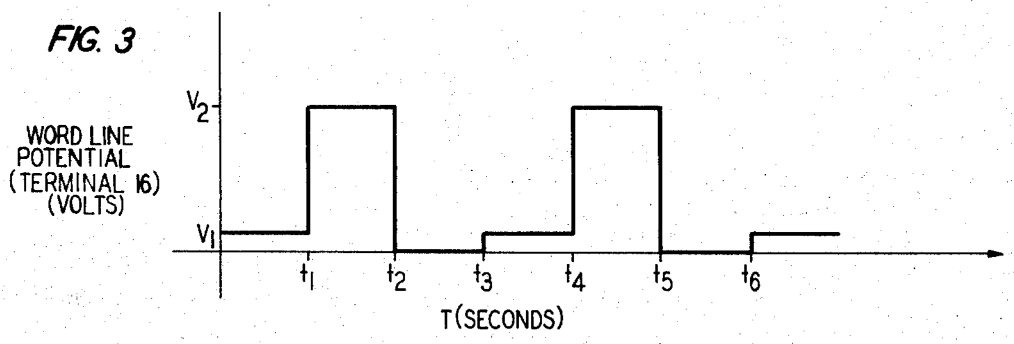
FIGS. 3 and 4 graphically illustrate the potentials applied to the terminals of a selected memory cell as a function of time.
Figure 4:
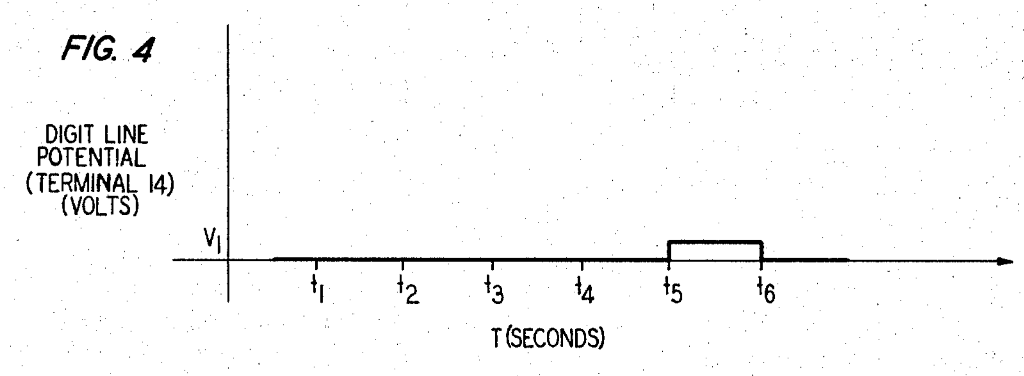
Figure 5:
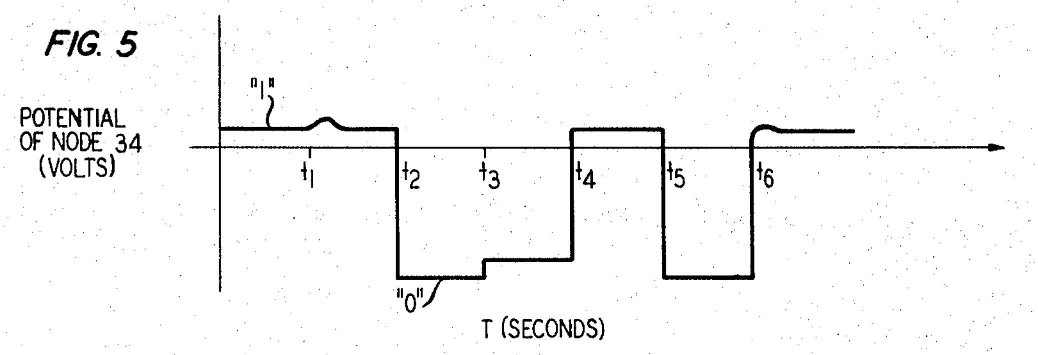
FIGS. 5 and 6 illustrate the corresponding potential of the base of the NPN transistor as a function of time and the conduction through it as a function of time, respectively.
Figure 6:
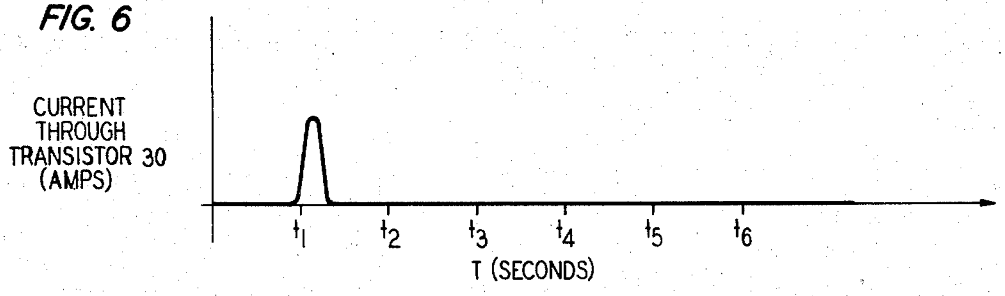

The typical operation of the memory cell of FIG. 2 can be easily seen from the voltage and current graphs of FIGS. 3, 4, 5 and 6. FIGS. 3 and 4 illustrate the potentials applied to terminals 16 and 14 by the word line control circuits 22 through word line 18, and the digit line control circuits 24, through digit line 20, respectively, as a function of time. FIG. 5 illustrates the corresponding potential of the base 34 of transistor 30 as a function of time. FIG. 6 illustrates the current flowing through transistor 30 as a function of time.

As is illustrated in FIGS. 3 and 4, at time $T=0$ the voltage applied to terminal 16 is at a first positive level, $v_1$, and terminal 14 is held at a reference potential which is a typically ground potential. FIG. 5 illustrates that the potential of the base 34 of transistor 30 is assumed to be at a positive potential which is defined as a "1" level. Typically this potential is 0.4 volt. FIG. 6 illustrates that there is no conduction in transistor 30 at $T=0$.

In order to read out the "1" stored in the cell and write a "0" into the cell, a positive polarity voltage pulse is applied at $T=t_1$ to node 16 by the word line control circuits 22 through word line 18. The leading edge of this pulse forces the potential of the collector of transistor 30 to potential $v_2$. As shown in FIG. 4, at $T=t_1$, the voltage on node 14 remains at the reference potential. The increase in potential of the collector of transistor 30 is capacitively coupled through $C_1$ and $C_2$ to the base 34 of transistor 30. As is illustrated in FIG. 5, the potential of the base 34 increases in response to the change in potential at the collector until the emitter-base junction of transistor 30 is forward-biased and prevents any further increase in base potential. Transistor 30 then starts to conduct since the potential of its collector is more positive than that of the emitter and its emitter-base junction is forward-biased. The current flow, which is illustrated in FIG. 6, represents an output "1" signal. This is indicative of the fact that the voltage on the base 34 of transistor 30 was at the "1" level as was originally assumed. The width of the read voltage pulse is such that conduction in transistor 30 ceases prior to time $T=t_2$.

At $T=t_2$ the potential on the word line is decreased from $v_2$ to the reference potential. The trailing edge of the read waveform lowers the word line potential and, through capacitive coupling causes the potential of the base 34 of transistor 30 to decrease to a level which is defined as the "0" level. Typically, the "0" level is approximately −3.6 volts. It is clear, therefore, that the positive edge of the read voltage pulse causes a readout of a "1" from the memory cell and that the trailing edge causes a "0" to be written into the cell.

The initial read pulse voltage waveform is repeated in order to now read out the "0" which has been written into the cell. At $T=t_3$ the voltage on the word line is increased from the reference potential to $v_1$ while the potential on the digit line is held at the reference potential. This causes the potential on the base of transistor 30 to increase slightly from the "0" level, to a level which is significantly less positive than the "1" level. At $T=t_4$ the potential of the word line is increased from $v_1$ to $v_2$. This, as is illustrated in FIG. 5, causes the base 34 of transistor 30 to increase in potential, but not sufficiently enough to cause the emitter-base junction of transistor 30 to be forward-biased and thereby allow conduction. This lack of conduction in transistor 30, as illustrated in FIG. 6, is indicative of a "0" stored in the cell.

At $T=t_5$ the potential of the word line potential is lowered to the reference potential. This causes the potential of the base of transistor 30 to return to the "0" level. During the entire interval from $T=t_2$ to $T=t_5$— the potential of the digit line is held at the reference potential. It is now clear that the read voltage pulse, which is applied to the word line (terminal 16) in addition to causing bit information stored in the cell to be read out, causes a "0" to be written into the cell.

In order to now write a "1" into the cell, the voltage on the digit line (terminal 14) is increased to $v_1$ at $T=t_5$, while the word line (terminal 16) is held at the reference potential. This causes the emitter-base junction of transistor 32 to be forward-biased and allows conduction within transistor 32 that causes the base 34 of transistor 30 to rise in potential to the "1" level. This brings us back to the initial base 34 potential assumed at $T=t_0$.

The preferred embodiment of the invention utilizes the two-terminal memory cells of FIG. 2 as a component of the memory array of FIG. 1. Potentials $v_1$ and $v_2$ of FIG. 3 are typically +1 and +8 volts, respectively. The time interval between $T=t$ and $T=t_2$ is typically 60 nanoseconds. Potential $v_1$ of FIG. 4 is typically +1 volt.

As has been denoted previously, the memory array of FIG. 1 is a word-organized memory. This means that when bit information is written into a selected memory cell that information in all other memory cells coupled to the same word line is affected. The operation of a single memory cell has been described above. In order to insure that bit information stored in all memory cells not connected to the word line containing a selected cell is not affected during the write or read operations of the selected cell, it is necessary to maintain the nonselected word lines all at potential $v_1$. This insures that information stored within these nonselected cells will not be disturbed.

The memory cell of FIG. 2 can be fabricated using standard integrated circuit fabrication techniques in approximately 2 square mils of a semiconductive substrate. Starting with a P-type semiconductor substrate, an N-type epitaxial layer is deposited thereon which serves as the collector of the NPN transistor. A P-type diffusion is then made into a central portion of the N-type epitaxial layer and then an N-type diffusion is made within the P diffusion. The P diffusion serves as the base of the NPN transistor and the N diffusion serves as the emitter. A second P diffusion is then made in the N-type epitaxial layer relatively close to the initial P-type diffusion. This second P diffusion serves as the emitter of a lateral PNP transistor whose base is common with the collector of the NPN transistor and whose collector is common with the base of the NPN transistor. The emitters of both transistors are then electrically connected and serve as one of the two terminals of the memory cell. A second electrical connection made to the N-type epitaxial layer serves as the second terminal of the memory cell.

From the foregoing, it is clear that the memory cell described herein is well-suited as a component for use in large information capacity memory arrays because its relatively simple structure allows for small physical size, only two connections need be made per cell, and there is no need for avalanche breakdown operation.

It is to be understood that the embodiments described are merely illustrative of the general principles of the invention. Various modifications are possible within the spirit of the invention. For example, a PNP transistor may be substituted for the NPN transistor and an NPN transistor may be substituted for the PNP transistor providing the relevant voltages are reversed. This configuration may be readily implemented using an oxide insulation fabrication scheme.

In addition, the emitters of the two transistors of the memory cell need not be coupled. The emitter of transistor 30 can be coupled to the conduction detectors 26 and the emitter of transistor 32 can be coupled to the digit control circuits 24. This configuration leads to a 3-terminal memory cell which may be desirable in some instances.

What is claimed is:

1. Semiconductor memory apparatus comprising:

a plurality of interconnected memory cells, each of which comprises two terminals and is adapted to store bit information;

each of said memory cells comprising first and second junction transistors which are complementary;

the first and second terminals being respectively connected to the collector of the first transistor and the emitter of the second transistor;

the collector and base of each of the first transistors being coupled to the base and collector, respectively, of each of the second transistors;

the base of each of said first transistors being coupled to the first terminal of each cell via a first capacitance and being coupled to the second terminal of each cell via a second capacitance;

the first transistor is an NPN type transistor;

the second transistor is a PNP type transistor; and the emitters of both transistors are electrically coupled.

2. The apparatus of claim 1 further comprising:

first voltage control circuits coupled to the first terminals;

second voltage control circuits coupled to the second terminals; and conduction detectors coupled to the second terminals.

3. Semiconductor memory apparatus comprising:

a plurality of interconnected memory cells, each of which comprises first and second terminals and is adapted to store bit information;

each of the memory cells comprising first and second junction transistors which are complementary;

the collector and base of each of the first transistors being coupled to the base and collector, respectively, of each of the second transistors;

the collector of the first transistor and the emitter of the second transistor being the first and second terminals, respectively;

the base of each of the first transistors being coupled to the first terminal via a first capacitance and being coupled to the second terminal via a second capacitance;

first write-in means coupled to the terminals of the cells for selectively forward biasing the emitter-base junction of the second transistor of a selected cell such that the potential of the base of the first transistor of the selected cell is set to a first potential;

second write-in means coupled to the terminals of the cells for causing the potential of the base of the first transistor of a selected memory cell to be set to a second potential;

read-out means coupled to each of said first terminals of each of the cells for causing conduction in the first transistor of a selected cell only if the potential of the base of the first transistor is set to the first potential; and detection means coupled to the cells for detecting conduction in the first transistors of each memory cell.

4. The apparatus of claim 3 wherein:

the first transistor is an NPN type transistor and the second transistor is a PNP type transistor; and the emitters of both transistors are electrically coupled.

5. A method for performing a memory function utilizing at least one memory cell which is comprised of a first junction transistor whose collector, base, and emitter are electrically coupled to the base, collector, and emitter of a second complementary junction transistor, respectively, consisting of the steps of:

writing a "1" into the memory cell by forward-biasing the emitter-base junction of the second transistor of the cell thereby causing conduction within it which causes the potential of the base of the first transistor to be set to a level defined as the "1" level;

reading out bit information stored within the cell and writing a "0" into the cell by applying a positive polarity voltage pulse to the collector of the first transistor of the cell, that causes conduction in the first transistor of the cell if and only if the cell stored a "1" and causes the potential of the base of the first transistor to be set to a level defined as the "0" level; and detecting bit information stored within the cell by monitoring conduction in the first transistor of the cell.

* * * * *